United States Patent
Arditti Ilitzky et al.

(10) Patent No.: US 9,276,704 B1
(45) Date of Patent: Mar. 1, 2016

(54) MAXIMUM LIKELIHOOD SEQUENCE DETECTION IN THE PHASE DOMAIN

(71) Applicant: Intel Corporation, Santa Clara, CA (US)

(72) Inventors: David Arditti Ilitzky, Guadalajara (MX); Edgar Borrayo Sandoval, Zapopan (MX); Arturo Veloz, Tlajomulco De Zuniga (MX); Rocio Hernandez Fabian, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/570,566

(22) Filed: Dec. 15, 2014

(51) Int. Cl.
| | |
|---|---|
| *H03H 7/30* | (2006.01) |
| *H03H 7/40* | (2006.01) |
| *H03K 5/159* | (2006.01) |
| *H04L 1/00* | (2006.01) |
| *H04L 25/03* | (2006.01) |
| *H04B 1/10* | (2006.01) |
| *H04W 84/18* | (2009.01) |

(52) U.S. Cl.
CPC ............... *H04L 1/0054* (2013.01); *H04B 1/10* (2013.01); *H04L 25/03006* (2013.01); *H04W 84/18* (2013.01)

(58) Field of Classification Search
CPC .. H04L 1/0054; H04L 25/03006; H04B 1/10; H04W 84/18
See application file for complete search history.

(56) References Cited

U.S. PATENT DOCUMENTS

| | | | |
|---|---|---|---|
| 6,349,109 B1* | 2/2002 | Lattard et al. ................ | 375/140 |
| 2002/0176521 A1* | 11/2002 | Kirke et al. ................... | 375/335 |
| 2003/0099313 A1* | 5/2003 | Li et al. ......................... | 375/343 |
| 2005/0175124 A1* | 8/2005 | Goldstein et al. ............. | 375/330 |
| 2007/0092018 A1* | 4/2007 | Fonseka et al. ............... | 375/265 |
| 2007/0115800 A1* | 5/2007 | Fonseka et al. ............... | 370/208 |
| 2010/0316107 A1* | 12/2010 | Van Thillo et al. ........... | 375/229 |
| 2010/0316161 A1* | 12/2010 | Kim et al. | |
| 2011/0142173 A1* | 6/2011 | Peng et al. .................... | 375/334 |

OTHER PUBLICATIONS

Xin Wang and Edwin E. Yaz, A New Nonlinear-Filter-Based Modulation/Demodulation Technique for Chaotic Communication, 2009 American Control Conference Hyatt Regency Riverfront, St. Louis, MO, USA Jun. 10-12, 2009.*

* cited by examiner

*Primary Examiner* — Erin File
(74) *Attorney, Agent, or Firm* — Schiff Hardin LLP

(57) ABSTRACT

A wireless device, and corresponding method, having a receiver configured to receive a signal having in-phase and quadrature components; a non-linear filter demodulator configured to translate noncoherently the in-phase and quadrature components into a phase domain signal; a coherence acquisition unit configured to estimate and correct at least one coherence parameter based on the in-phase and quadrature components and the phase domain signal; and a detector configured to detect information in the phase domain signal.

18 Claims, 3 Drawing Sheets

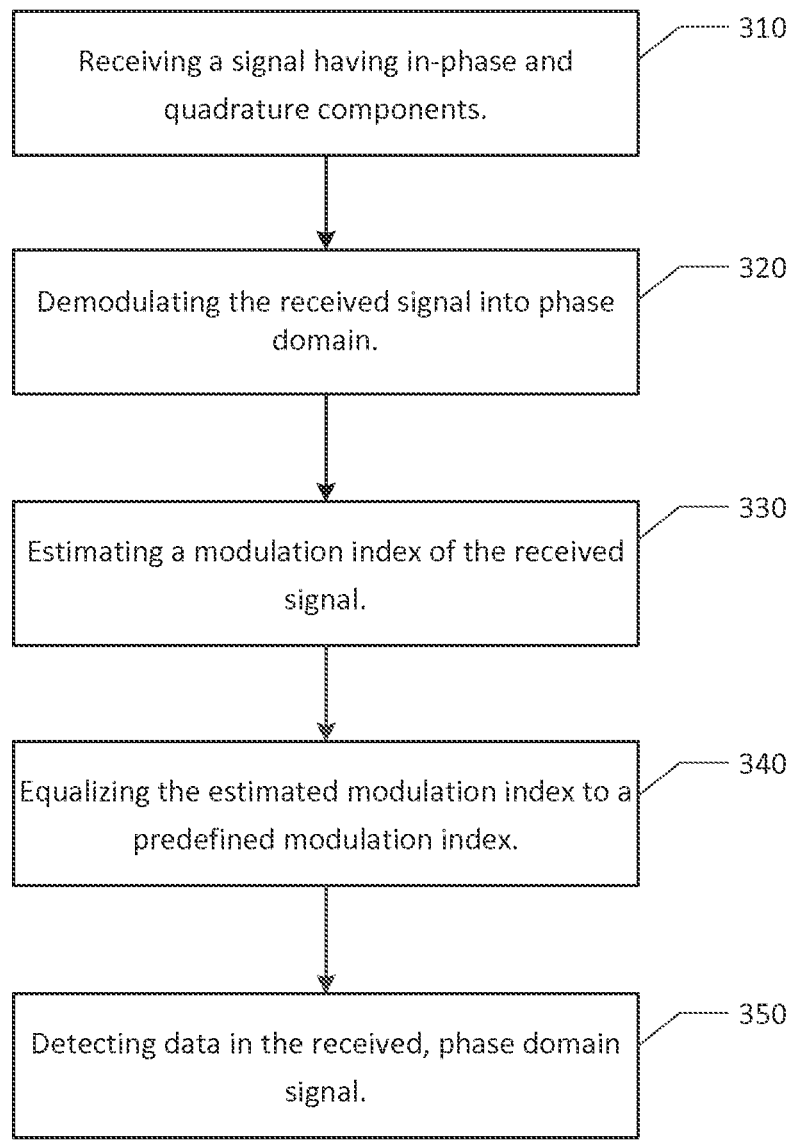

MAXIMUM LIKELIHOOD SEQUENCE DETECTION IN THE PHASE DOMAIN

BACKGROUND

Low-power wireless sensor and actor networks (LP-WSAN) standards require low power and a simplified protocol. FIG. 4 illustrates a low-power wireless sensor and actor network 400 having a sensor 410 and an actor 420. The sensors are multifunctional devices that communicate untethered in short distances. The actors are resource-rich devices with higher processing and transmission capabilities, and collect and process sensor information and perform actions based on the information gathered.

The low power and simplified protocol requirements of LP-WSANs compromise performance, such as in packet error rate (PER). In the Bluetooth low energy (BT-LE) standard, for example, if there is one packet error, there are two additional packets transmitted—one packet informing that the previously sent packet was not received correctly, and another packet to repeat the operation. The result is an increased average energy per effectively communicated bit.

Many LP-WSANs are based on continuous phase modulation (CPM). CPM is a method for modulation of information where, in contrast to other phase modulation techniques in which the carrier phase abruptly resets to zero at the start of every symbol, the carrier phase is modulated continuously. In order for a CPM receiver to have a low PER, it requires perfect knowledge of modulation parameters. However, because of the laxity when constructing the receiver, the modulating parameters of peer transmitting devices are unknown, and moreover, vary between devices. This complicates construction of a coherent detector, which exploits knowledge of the carrier's phase and maximizes BER (bit error rate)/PER performance.

The optimal detection scheme for CPM to maximize performance is Maximum Likelihood Sequence Detection (MLSD). MLSD is a mathematical algorithm for optimally extracting useful information out of the CPM noisy received CPM signal. MLSD is only optimal if, and only if, the noise added to the received CPM signal is white and Gaussian. The complexity of implementing MLSD for CPM signals stems from its structure depending on the modulation index of the received signal. The modulation index determines the topology of the detection scheme, that is, the trellis structure, and can increase the number of states in the trellis exponentially. Moreover, estimation and equalization of the modulation index is nonlinear, making an MLSD implementation with variable modulation index capability not feasible.

BRIEF DESCRIPTION OF THE DRAWINGS

FIG. 3 illustrates a flowchart of a method of wireless communication.

DESCRIPTION OF THE EMBODIMENTS

The present disclosure is directed to a wireless device configured to translate noncoherently in-phase and quadrature (I/Q) components of a received signal into a phase domain signal, estimate and correct coherence parameters based on the in-phase and quadrature components and the phase domain signal, and then detect information coherently in the phase domain signal. If optimal coherent detection is desired, the modulation index of the phase domain signal may be estimated and equalized into a predetermined modulation index, thereby enabling maximum likelihood sequence detection (MLSD) in the phase domain.

Figure 1:
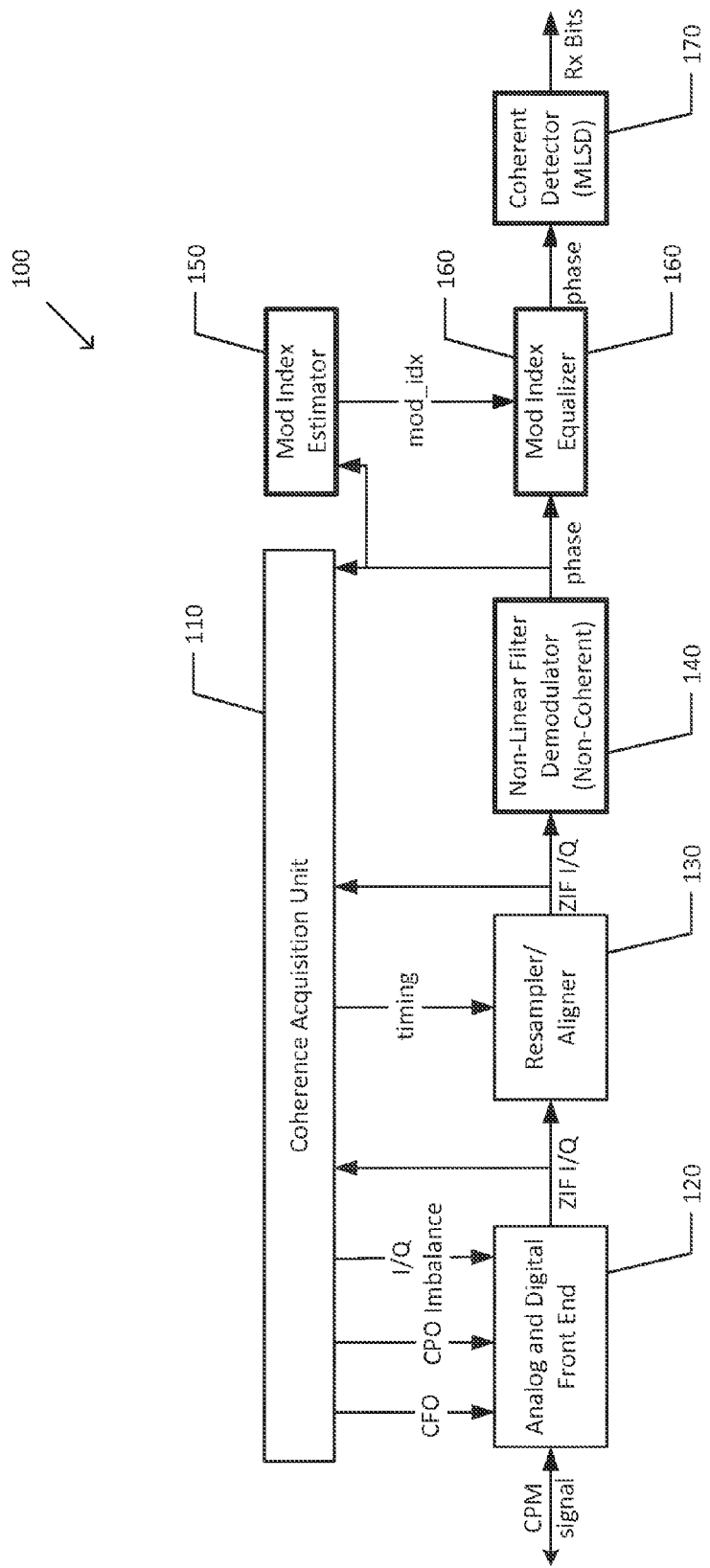
FIG. 1 illustrates a schematic diagram of a wireless device.

FIG. 1 illustrates a schematic diagram of a wireless device 100.

The wireless device 100 includes a receiver (110, 120, and 130), a non-linear filter demodulator 140, a modulation index estimator 150, a modulation index equalizer 160, and a detector 170. The receiver includes a coherent acquisition block 110, an analog and digital front end 120, and a sampler/aligner 130.

The analog and digital front end 120 is configured to receive a CPM analog signal, convert the signal's frequency to a low frequency, and deterministically filter out undesired frequency bands. The output of the analog and digital front end 120 is a digital baseband signal having a zero intermediate frequency (ZIF) and in-phase and quadrature components. The analog and digital front end 120 also receives from the coherent acquisition block 110 inputs that is, carrier frequency offset (CFO), carrier phase offset (CPO), and I/Q imbalance, which are parameters that are configured in the analog domain, in a known manner. The analog and digital front end 120 is configured to correct the CFO and CPO, though the disclosure is not limited in this respect. The CFO and CPO may be corrected in another component.

The resampler/aligner 130 is instructed by the coherence acquisition unit 110, based on timing parameters, to align sampling instants, at a desired sampling rate, with optimal locations with respect to symbol boundaries. The resampler/aligner 130 is disclosed as being located between the analog and digital front end 120 and the non-linear filter demodulator 140, but the disclosure is not limited in this respect. This resampling/aligning is also known and need not be described further here.

The non-linear filter demodulator 140 is configured to demodulate the received I/Q baseband signal into a phase signal. If the non-linear filter demodulator 140 is optimal, the noise at its output is white and Gaussian. Additive White Gaussian Noise (AWGN) is a basic noise model mimicking the effect of random processes that occur in nature. The modifiers denote specific characteristics: "additive" because it is summed linearly with the signal; "white" because it has uniform power across the frequency band; and "Gaussian" because it has a probability density function that is Gaussian, or normal.

The I/Q baseband signal received by the non-linear filter demodulator 140 is represented by Equation 1 as follows:

$$S_{LP}(t) = \cos[\theta(t)] + j\sin[\theta(t)] = \cos[h\phi(t)] + j\sin[h\phi(t)] \quad \text{(Equation 1)}$$

where $\theta(t)$ is the CPM modulating signal, h is the modulation index, and $\phi(t)$ is normalized CPM modulating signal. From the I/Q baseband signal, the non-linear filter demodulator 140 performs a non-coherent angle demodulation, that is, an instantaneous phase estimation. This demodulation does not require timing or coherency acquisition, or the information carried by the phase. The non-linear filter demodulator 140 estimates the phase as a function of time. The output function in Equation (1) is invertible, so the phase is observable. As the non-linear filter demodulator 140 becomes closer to optimal, the estimation error becomes more white and Gaussian. Thus, the demodulation will result in an ideal phase modulating signal with white Gaussian noise, as indicated by Equation 2 as follows:

$$\hat{\theta}(t) \xrightarrow[NLF \to optimal]{} \theta(t) + n(t) \quad \text{(Equation 2)}$$

where θ(t) is the CPM modulating signal and n(t) is white Gaussian noise. Moreover, as a direct consequence of the non-linear filtering, the signal-to-noise ratio (SNR) in the phase domain (output) is higher than the SNR on the I/Q (input) domain.

The coherency acquisition block 110 uses the signal phase output by the non-linear filter demodulator 140 to determine the signal timing, that is, where transmitted bits start and end, and this information is fed to the sampler/aligner 130. The coherency acquisition (i.e., CFO, CPO correction, symbol timing recovery, modulation index equalization, etc.) and timing acquisition are executed in the phase domain much more easily and with better performance.

The modulation index estimator 150 is configured to estimate a modulation index of the received signal. The modulation index specifies the maximum frequency deviation from the carrier frequency due to the modulation. Because the signal is now in the phase domain, it is now a simpler linear problem to estimate the modulation index. The estimation may be any linear estimation technique for unknown linear coefficients, such as least-squares, recursive-least-squares, constrained-least-squares, maximum likelihood estimation, etc. Alternatively, other linear methods might yield a better continuous estimation of the modulation index if the modulation index is expected to vary within a packet.

The modulation index equalizer 160 is configured to equalize the estimated modulation index, mod_idx, into a predefined modulation index. The predefined modulation index may be, for example, 0.5, which is a value that improves performance and minimizes complexity because it represents a trellis with a small number of states. In the phase domain the equalization of the modulation index to a pre-defined modulation index is a much simpler linear problem.

The detector 170 is a Maximum Likelihood Sequence Detector (MLSD), and is configured to detect information in the signal. MLSD can be used because the signal is in the phase domain, has a known modulation index, additive white Gaussian noise, and a better SNR than the original SNR in the I/Q domain. MLSD performed in the phase domain reduces the complexity by half because analysis is on only one signal (phase signal) instead of two signals (I and Q signals). The predefined value of the modulation index is chosen to minimize complexity in the MLSD implementation while still guaranteeing a good BER/PER performance.

Figure 2:
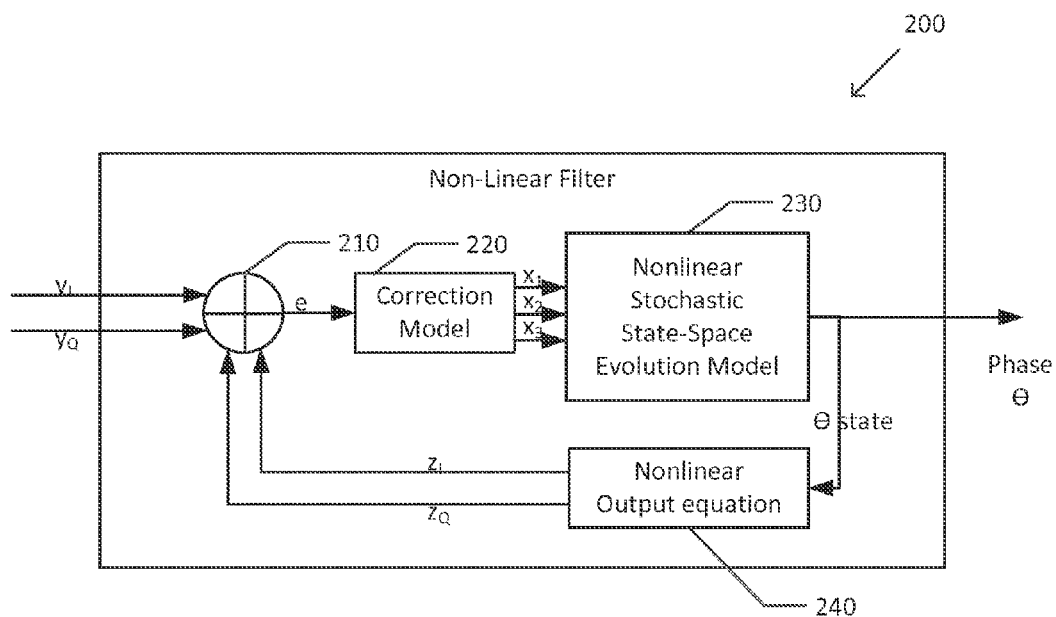
FIG. 2 illustrates a schematic diagram of a generic non-linear filter demodulator.
Figure 4:
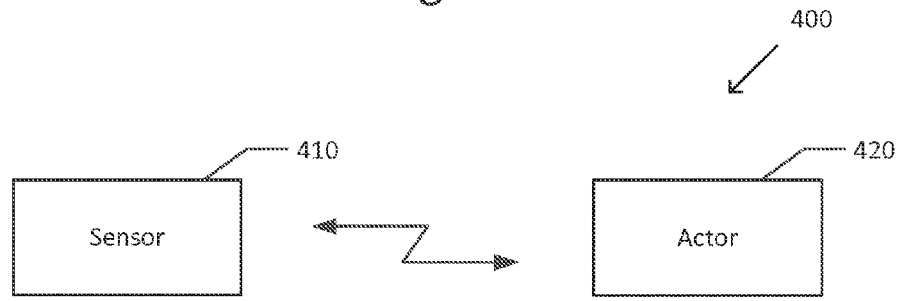
FIG. 4 illustrates a schematic diagram of a low-power wireless sensor and actor network.

FIG. 2 illustrates a schematic diagram of a generic non-linear filter demodulator 200, which is used to develop the non-linear filter demodulator 140 of FIG. 1 using Markov stochastic process modeling.

The generic non-linear filter demodulator structure 200 includes an adder 210, a correction model 220, a stochastic state-space evolution model 230, and a non-linear output equation 240. By way of overview, the structure 200 has a feedback function that varies with time in accordance with an output estimation error, e. Estimation based on state-space models, as opposed to input/output models, is more suitable because the output in CPM relates non-linearly to the information signal.

Nonlinear filtering based on Markov process theory first requires the creation of a stochastic state-space evolution model 230 that represents the target signal (instantaneous phase) and the measured signal (ZIF signal) up to the statistics order that the filter requires. A general Markov process model is represented in Equations (3) - (5), as follows:

$$\dot{x} = f(x) + g(x) w_p \quad \text{(Equation 3)}$$

$$z = h(x) \quad \text{(Equation 4)}$$

$$y = z + w_m \quad \text{(Equation 5)}$$

where $w_p$ and $w_m$ are independent white Gaussian noise, that is, the process noise and measurement noise, respectively, x is the process state vector of the evolution equation, z is the output, and y is the measurement. Measurement noise, $w_m$, is the noise being filtered out.

By exploiting properties of the CPM signal, a generalized structure for the CPM Markov model can be developed as follows:

1) Because the ideal received signal will have the form of equation (1), and the Markov model for a clean output without measurement noise should comply with equation (4), the target signal, θ(t), should be part of the state vector x.

2) Three sets of state variables are used for the state-space model for the general CPM signal. The state x of Equation (3) above is comprised by these three sets of variables, that is, a set of auxiliary variables $x_1$, a set of instantaneous frequency variables $x_2$, and a set of instantaneous phase variables $x_3$, which are described in more detail below.

2a) The first set of state variables $x_1$ are auxiliary variables for the creation of a multinomial (or poly-modal with thin spread of each mode) distribution to model the source of information. $x_1(t)$ is a Gaussian correlated process with very short correlation time.

2b) The second set of state variables $x_2$ model instantaneous frequencies:

$$x_2(t) \doteq \dot{\theta}(t) \quad \text{(Equation 6)}$$

2c) The third set of state variables $x_3$ are an integral of the instantaneous frequencies, and model instantaneous phases:

$$x_3(t) \doteq \theta(t) \quad \text{(Equation 7)}$$

3) Derivation of the evolution equation for the state vector:

3a) $x_1(t)$ provides, as a set of state variables, a quasi-noise process. From Doob's theorem for a Gauss-Markov process, a single set of state variables with linear drift, $f_1 \cdot x_1$, and constant diffusion, $g_1$, is required to generate an exponentially correlated Gaussian process, and the correlation can have an arbitrary relaxation time. Thus it can be made arbitrarily close to a delta-correlated process. For this reason, the evolution equation for the quasi-noise process is as follows:

$$\dot{x}_1 = f_1 \cdot x_1 + g_1 \cdot w_p \quad \text{(Equation 8)}$$

3b) A transformation function of $x_1$ feeds the $x_2$ evolution, $\rho(x_1)$, is required for the statistical modelling the M-ary symbol process (M-modal) at the input to the CPM modulator. A nonlinear static, that is, memory-less, function having a finite set of output values will enable the translation of the quasi-noise process distribution, into an M-modal (or multinomial) quasi-white process without imprinting memory into it. One such function is the sign function, for example, a binary modulation has a binomial distribution with equal probability for the +1 and −1 values that can be modelled with the sign function applied to the quasi-noise process. Alternatively, smoother functions can be used as the sigmoid functions and logistic functions:

$$\rho(x_1): \mathfrak{R} \to \left\{ -\left(\frac{M}{2}\right), -\left(\frac{M}{2}-1\right), \ldots \right. \quad \text{(Equation 9)}$$

$$\left(\frac{M}{2}-1\right), \left(\frac{M}{2}\right)\bigg\}$$

3c) $x_2(t)$ provides statistics of the CPM frequency modulating signal. This is modelled through a feedback (nonlinear) pulse shaping function $f_2(x_2)$ for the state variables, with the same response as the CPM pulse shaping function, translates the M-modal quasi-white process:

$$\dot{x}_2 = f_2(x_2) + \rho(x_1) \quad \text{(Equation 10)}$$

3d) $x_3(t)$ provides statistics of the CPM phase modulating signal. Because $x_2$ already models the instantaneous frequency, instantaneous phase can be obtained simply by integration:

$$\dot{x}_3 = x_2 \quad \text{(Equation 11)}$$

4) The measurement operator is then $h(\cdot) = \cos(\cdot) + j\sin(\cdot)$ applied to the instantaneous phase signal $x_3(t)$ as follows:

$$z = \cos(x_3) + j\sin(x_3) \quad \text{(Equation 12)}$$

With this procedure, a Markov process model for any type of CPM signal can be designed in order to apply Markov nonlinear filtering theory to demodulate the signal near optimally.

FIG. 3 illustrates a flowchart 300 of a method of wireless communication.

At Step 310, the receiver (110, 120, and 130) of the wireless device 100 receives a signal having in-phase and quadrature components.

At Step 320, the non-linear filter demodulator 140 demodulates the received signal into the phase domain.

At Step 330, the modulation index estimator 150 may estimate a modulation index of the received signal. This estimating may be, for example, a least-squares estimating, as discussed above.

At Step 340, the modulation index equalizer 160 may equalize the estimated modulation index to a predefined modulation index. The predefined modulation index may be, for example, 0.5.

At Step 350, the detector 170 detects information in the received, phase domain signal. This detection is Maximum Likelihood Sequence Detection (MLSD), as discussed above.

The method of the flowchart 300 of FIG. 3 may be implemented in an application specific integrated circuitry. Alternatively, a computer program product embodied on a non-transitory computer-readable medium comprising program instructions may be configured such that when executed by processing circuitry cause the processing circuitry to implement the method of the flowchart 300 of FIG. 3.

The wireless device 100 and method 300 disclosed herein enable near optimal sequence detection irrespective of the modulation index variation, improves the signal-to-noise ratio at the input of the MLSD detector 170, and enables a less expensive and easier estimation of the modulation index, timing parameters and coherence parameters due to the demodulation from the I/Q domain to the phase domain. The result is lower BER/PER, and lower power consumption due to fewer retransmissions, even with a low-cost radio frequency analog front end.

Example 1 is a wireless device, comprising a receiver configured to receive a signal having in-phase and quadrature components; a non-linear filter demodulator configured to translate noncoherently the in-phase and quadrature components into a phase domain signal; a coherence acquisition unit configured to estimate and correct at least one coherence parameter based on the in-phase and quadrature components and the phase domain signal; and a coherent detector configured to detect information in the phase domain signal.

In Example 2, the subject matter of Example 1 can optionally include an estimator configured to estimate a modulation index of the received signal; and an equalizer configured to equalize the estimated modulation index to a predefined modulation index.

In Example 3, the subject matter of Example 2, wherein the estimator is configured to perform a linear estimation technique for unknown linear coefficients.

In Example 4, the subject matter of Example 2, wherein the predefined modulation index is about 0.5.

In Example 5, the subject matter of Example 2, wherein the detector is a Maximum Likelihood Sequence Detector (MLSD).

In Example 6, the subject matter of Example 1, wherein the nonlinear filter demodulator is based on a model comprising a plurality of sets of variables.

In Example 7, the subject matter of Example 2, wherein the plurality of sets of variables comprise a set of auxiliary variables, a set of instantaneous frequency variables, and a set of instantaneous phase variables.

Example 8 is a wireless communication network comprising a first wireless device, which is the wireless device of Example 1; and a second wireless device communicating with the first wireless device.

In Example 9, the subject matter of Example 8, wherein the wireless communication network is a low-power wireless sensor and actor network (LP-WSAN), the first wireless device is an actor, and the second wireless device is a sensor.

Example 10 is a method of wireless communication, comprising receiving, by a receiver, a signal having in-phase and quadrature components; translating noncoherently, by a non-linear filter demodulator, the in-phase and quadrature components into a phase domain signal; estimating and correcting, by a coherence acquisition unit, at least one coherence parameter based on the in-phase and quadrature components and the phase domain signal; and detecting, by a coherent detector, information in the phase domain signal.

In Example 11, the subject matter of Example 10 can optionally include estimating, by an estimator, a modulation index of the received signal; and equalizing, by an equalizer, the estimated modulation index to a predefined modulation index.

In Example 12, the subject matter of Example 11, wherein the estimating by the coherence acquisition unit is linear estimation for a plurality of unknown linear coefficients.

In Example 13, the subject matter of Example 11, wherein the predefined modulation index is about 0.5.

In Example 14, the subject matter of Example 10, wherein the detecting step is performed using Maximum Likelihood Sequence Detection (MLSD).

Example 15 is a computer program product embodied on a non-transitory computer-readable medium comprising program instructions configured such that when executed by processing circuitry cause the processing circuitry to implement the method of Example 10.

Example 16 is a wireless device, comprising a receiving means for receiving a signal having in-phase and quadrature components; a non-linear filtering demodulating means for translating noncoherently the in-phase and quadrature components into a phase domain signal; a coherence acquisition means for estimating and correcting at least one coherence parameter based on the in-phase and quadrature components and the phase domain signal; and a coherent detection means for detecting information in the phase domain signal.

In Example 17, the subject matter of Example 16 can optionally include an estimating means for estimating a modulation index of the received signal; and an equalizing means for equalizing the estimated modulation index into a predefined modulation index.

In Example 18, the subject matter of Example 16, wherein the detection means is a Maximum Likelihood Sequence Detector.

In Example 19 the subject matter of any of Examples 2-4, wherein the detector is a Maximum Likelihood Sequence Detector (MLSD).

In Example 20, the subject matter of any of Examples 1-5, wherein the nonlinear filter demodulator is based on a model comprising a plurality of sets of variables.

In Example 21, the subject matter of Example 20, wherein the plurality of sets of variables comprise a set of auxiliary variables, a set of instantaneous frequency variables, and a set of instantaneous phase variables.

In Example 22, the subject matter of any of Examples 10-11, wherein the estimating by the coherence acquisition unit is linear estimation for a plurality of unknown linear coefficients.

In Example 23, the subject matter of Example 22, wherein the detecting step is performed using Maximum Likelihood Sequence Detection (MLSD).

Example 24 is a computer program product embodied on a non-transitory computer-readable medium comprising program instructions configured such that when executed by processing circuitry cause the processing circuitry to implement the method of any of Example 10-14.

In Example 25, the subject matter of any of Examples 16-17, wherein the detection means is a Maximum Likelihood Sequence Detector.

Example 26 is an apparatus substantially as shown and described.

Example 27 is a method substantially as shown and described.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present application. This application is intended to cover any adaptations or variations of the specific embodiments discussed herein.

The invention claimed is:

1. A wireless device, comprising:
a receiver configured to receive a signal having in-phase and quadrature components;
a non-linear filter demodulator configured to translate noncoherently the in-phase and quadrature components into a phase domain signal;
a coherence acquisition unit configured to estimate and correct at least one coherence parameter based on the in-phase and quadrature components and the phase domain signal; and
a coherent detector configured to detect information in the phase domain signal.

2. The wireless device of claim 1, further comprising:
an estimator configured to estimate a modulation index of the received signal; and
an equalizer configured to equalize the estimated modulation index to a predefined modulation index.

3. The wireless device of claim 2, wherein the estimator is configured to perform a linear estimation technique for unknown linear coefficients.

4. The wireless device of claim 2, wherein the predefined modulation index is about 0.5.

5. The wireless device of claim 2, wherein the detector is a Maximum Likelihood Sequence Detector (MLSD).

6. The wireless device of claim 1, wherein the nonlinear filter demodulator is based on a model comprising a plurality of sets of variables.

7. The wireless device of claim 6, wherein the plurality of sets of variables comprise a set of auxiliary variables, a set of instantaneous frequency variables, and a set of instantaneous phase variables.

8. A wireless communication network comprising:
a first wireless device, which is the wireless device of claim 1; and
a second wireless device communicating with the first wireless device.

9. The wireless communication network of claim 8, wherein the wireless communication network is a low-power wireless sensor and actor network (LP-WSAN), the first wireless device is an actor, and the second wireless device is a sensor.

10. A method of wireless communication, comprising:
receiving, by a receiver, a signal having in-phase and quadrature components;
translating noncoherently, by a non-linear filter demodulator, the in-phase and quadrature components into a phase domain signal;
estimating and correcting, by a coherence acquisition unit, at least one coherence parameter based on the in-phase and quadrature components and the phase domain signal; and
detecting, by a coherent detector, information in the phase domain signal.

11. The method of claim 10, further comprising:
estimating, by an estimator, a modulation index of the received signal; and
equalizing, by an equalizer, the estimated modulation index to a predefined modulation index.

12. The method of claim 11, wherein the estimating by the coherence acquisition unit is linear estimation for a plurality of unknown linear coefficients.

13. The method of claim 11, wherein the predefined modulation index is about 0.5.

14. The method of claim 10, wherein the detecting step is performed using Maximum Likelihood Sequence Detection (MLSD).

15. A computer program product embodied on a non-transitory computer-readable medium comprising program instructions configured such that when executed by processing circuitry cause the processing circuitry to implement the method of claim 10.

16. A wireless device, comprising:
a receiving means for receiving a signal having in-phase and quadrature components;
a non-linear filtering demodulating means for translating noncoherently the in-phase and quadrature components into a phase domain signal;
a coherence acquisition means for estimating and correcting at least one coherence parameter based on the in-phase and quadrature components and the phase domain signal; and a coherent detection means for detecting information in the phase domain signal.

17. The wireless device of claim 16, further comprising:
an estimating means for estimating a modulation index of the received signal; and
an equalizing means for equalizing the estimated modulation index into a predefined modulation index.

18. The wireless device of claim 16, wherein the detection means is a Maximum Likelihood Sequence Detector.

* * * * *